(No Model.)
G. ACKERMANN & J. WAGNER.
APPARATUS FOR CANNING FRUITS, MEATS, &c.
No. 353,911. Patented Dec. 7, 1886.
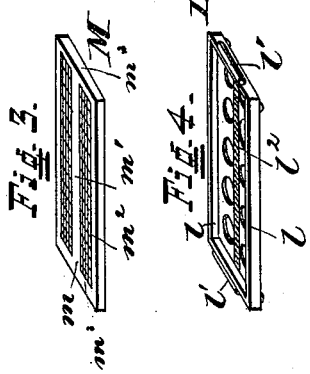
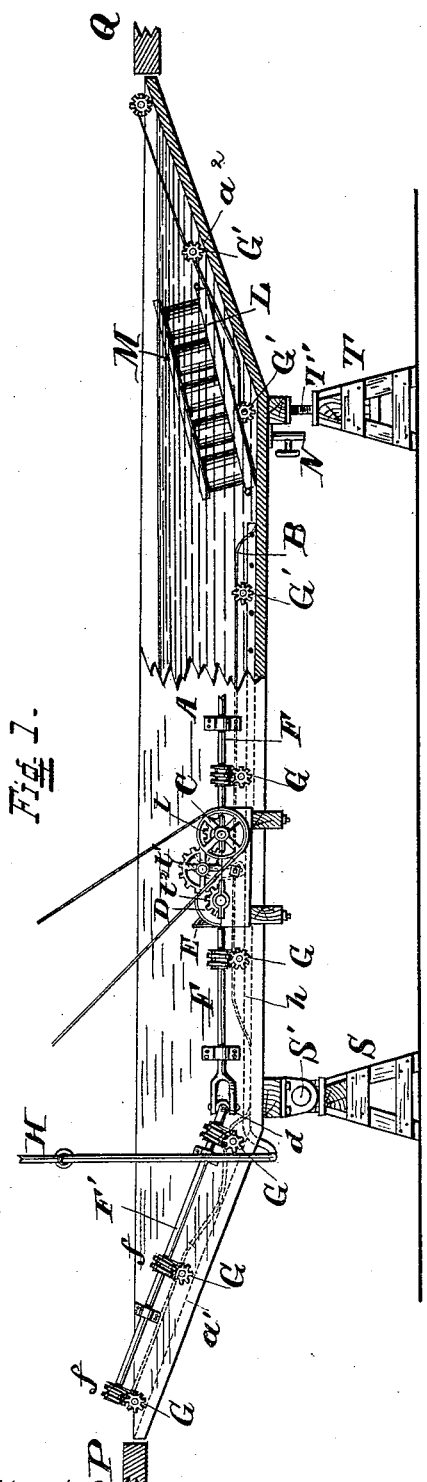
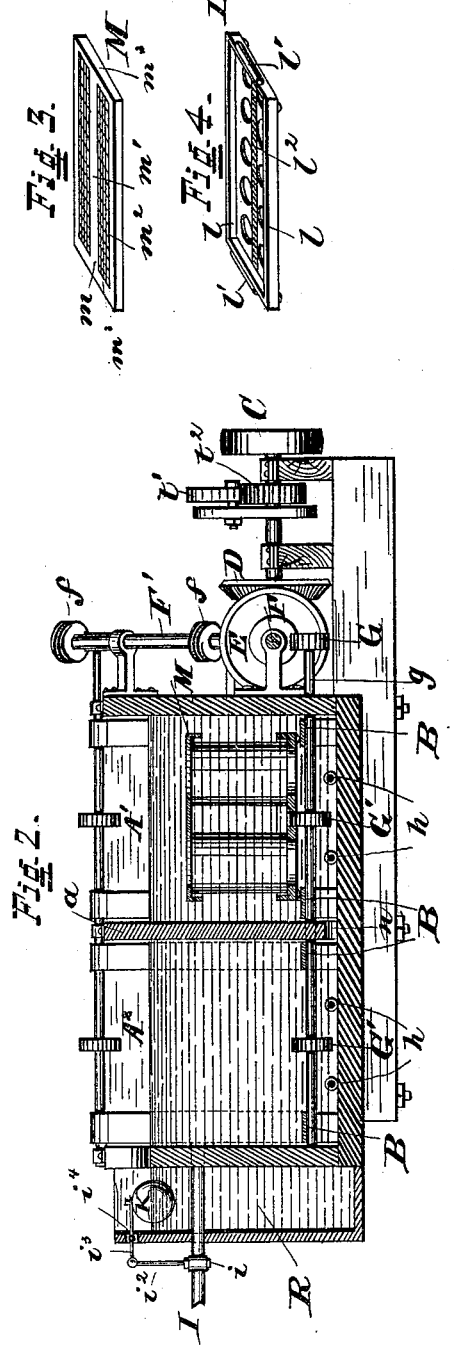
Attest:
Jno. W. Frehlix
O. M. Hill
Inventor
George Ackermann and
John Wagner,
by Wm. Hubbell Fisher, Atty

UNITED STATES PATENT OFFICE.

GEORGE ACKERMANN, OF CINCINNATI, OHIO, AND JOHN WAGNER, OF DAYTON, KENTUCKY.

APPARATUS FOR CANNING FRUITS, MEATS, &c.

SPECIFICATION forming part of Letters Patent No. 353,911, dated December 7, 1886.

Application filed August 14, 1884. Serial No. 140,483. (No model.)

*To all whom it may concern:*

Be it known that we, GEORGE ACKERMANN, a resident of the city of Cincinnati, in Hamilton county and State of Ohio, and JOHN WAGNER, a resident of the city of Dayton, in Campbell county and State of Kentucky, have invented certain new and useful Improvements in Apparatus for Canning Fruits, Meats, and the Like, and in the Apparatus for Effectuating the said Purposes, of which the following is a specification.

In the ordinary process of canning, a quantity of sirup or other material—as, for instance, a solution of borax as an anti-ferment—is poured into each can. The can is then capped—that is, has the lid soldered on—and is again boiled, which causes contained gases to expand and rise to the top of the can. A small puncture is now made in the top of the can and the contained gases permitted to escape, after which the hole is soldered over and the can is ready for packing away. Two steps in this process are unsatisfactory and tedious—viz., the addition by hand or machinery of sirup or borax to each can separately, and, secondly, the steps taken to remove gases from the can. By the aid of our machine these processes are much simplified.

The several features of our invention and the various advantages resulting from their use, conjointly or otherwise, will be apparent from the following specification and claims. The preferred apparatus for carrying our improved process into effect will now be described.

In the accompanying drawings, making part of this specification, Figure 1 is a side view of a machine illustrating our apparatus, the right-hand end being shown in sectional elevation. Fig. 2 is a vertical cross-section. Fig. 3 is a view of the can-cover, and Fig. 4 illustrates the can-carrier.

Broadly speaking, the machine consists of a tank filled with hot sirup or water, or solution of borax or the like, through which the open cans, after being filled with uncooked fruit or vegetables, or meats, &c., are slowly drawn by appropriate devices. The preferred mode of constructing this tank is as follows: The tank A is preferably divided into two longitudinal compartments, $A'$ $A^2$, by a partition, $a$. Preferably this partition does not extend quite down to the bottom of the tank, but a small space is left between the bottom of the partition and the upper surface of the bottom of the tank, thereby leaving a space, $n$, whereby the one compartment $A'$ is connected with the other compartment, $A^2$. The bottom of each of these compartments has at each end the conformation of an inclined plane, $a'$ $a^2$.

The preferred means for moving the can-carriers through the tank and of guiding the can-carriers while in the tank are as follows: Along the bottom of the tanks, including the inclined surfaces $a'$ $a^2$, are placed tracks or guides B. These tracks B are preferably flat, made of metal, and shaped as shown in Fig. 1, and arranged along the sides of the tank a short distance above the bottom of the latter. The can-carrier with its load rests on these tracks, as shown in Fig. 2, and they serve to keep it above the bottom of the tank and just high enough over the pinions which force the can-carrier along to permit the pinions to mesh with the teeth in the carrier, as will be more fully explained further on.

The preferred means for operating the pinions are as follows: Appropriately secured to the outside of the tank, and more or less centrally located as respects the latter, is a driving-wheel, C, which directly, or more or less indirectly, through the intermission of several cog-wheels, as $t$ $t'$ $t^2$, operates the beveled spur-wheel D, which latter meshes with the bevel gear-wheel E, rigidly secured to a shaft or axle F, extending along the side of the tank, parallel to the bottom, and at the points where the bottom ceases to be horizontal and becomes inclined this shaft F connects with the other shafts, $F'$. The connection is made in each case by means of a universal joint, $d$, so that the rotation of the shaft F rotates the shafts $F'$. At intervals along the shafts F $F'$ are placed worms $f$, which latter mesh with small cog-wheels G. The shafts $g$, on which the cog-wheels G are rigidly centered, pass across the tank through both compartments $A'$ and $A^2$. They pass just under the tracks B, and in the middle of each tank they carry cog-wheels $G'$, which mesh with appropriate teeth in the can-carriers.

H indicates a steam-pipe, which enters the tank and divides into pipes $h$, and these run longitudinally along the bottom of the tank, and the steam passing through them heats the fluid in the tank.

A preferred means for keeping up and regulating the supply of sirup or preserving-fluid in the tanks is as follows: The pipe I leads from a reservoir where the fluid is held to the tank. The supply is regulated automatically in the following manner: At $i$ in the pipe I a valve is placed, which closes with the descent of its valve stem $i^2$ and opens when the latter rises. A lever, $i^3$, is fulcrumed at $i^4$, and is pivoted to the stem $i^2$ at one end, while it carries a float, K, at the other end. The float K resting on the top of the fluid in the tank rises and lowers with it, and in this way automatically regulates the valve $i$, and with it the supply of sirup or other liquid. For obvious reasons, the tank is usually provided with auxiliary chamber R to receive the float K. This chamber R communicates with said tank, so that the liquid in the tank and in said chamber may be at the same level. When this chamber R is present, the float K floats on the liquid in the chamber R, and thus will in no wise interfere with the movements of the carriers, cans, can-covers, &c., moving through the tank.

The preferred form of can-carrier is indicated by letter L, (see Fig. 4,) and is a plate with a flange, $l$, extending upwardly around its edge. This plate is provided at its ends with handles $l'$, and is usually provided with recesses $l^3$, to respectively receive the bottom of the respective cans. These handles are preferably made of wood or other substance which is a non-conductor of heat, so that the holder may be readily handled as soon as it leaves the hot tank. Extending longitudinally through the center of plate L is a tooth-plate, $l^2$, whose teeth, transverse bars, or cogs are at the under side of plate L, and mesh with the cog-wheels G' as the plate L passes over the side cog-wheels. Instead of an ordinary tooth-plate, we usually perforate the plate $l^2$ with rectangular openings, leaving a series of bars extending across, against which the teeth of the cog-wheels impinge.

The can-cover M, in one of its most desirable forms, consists of a frame, $m$, having a longitudinal bar, $m'$, connecting the end pieces, $m^3$. Over the openings thus formed a wire net-work, $m^2$, is stretched.

In Fig. 1 the ends of the tables P and Q are shown. One is the table from which the cans are pushed into the tank, and on the other they are received when they emerge.

N is a valve at the bottom of the tank, through which the fluid may be drawn off.

The tank is preferably mounted on trestles or supports S and T.

The cans after being filled are placed on the table P. Here they are placed upon carriers L, each carrier usually holding from six to ten cans. Over the top of these cans a cover, M, is placed. The whole is now placed on the tracks and started through the tank. The motion imparted to the wheel C is communicated by means of the gearing to the shafts F F'. The worms $f$ on the rods turning with them slowly turn the wheels G, and with them the wheels G', mounted on the same shaft. The wheels G' mesh with the teeth $l^2$ of the can-carrier, and gradually move the can-carrier with its load of cans along. The cans descend into the hot fluid in the tank and are completely immersed in it. The wire-netting $m^2$ permits the sirup or other liquid to enter the cans, but prevents the solid contents of the can from escaping. At the same time any air or gases in the can are driven off, and when the can is taken out of the tank its cover is immediately soldered on, and the usual puncturing of the lid and subsequent boiling are not necessary. Thus a very tedious step in the process of filling and capping the cans is avoided.

In operating the machine one can-holder after another is put into the tank, several being in each compartment at a time. The supports S T are preferably provided with means for inclining that end portion of the tank from which the cans leave the tank, and a desirable means consists as follows: One of the supports, as S, is pivotally connected by pivot S' to the tank, and between the bottom of the tank and at the upper portion of support T is placed an elevating device, usually a screw or screws, T', screwed into the trestle or support T. By turning the screw to the right or left the said exit end of the tank is elevated or depressed at will. The object of this depression or elevation of this exit end of the tank is to change the inclination of the incline $a^2$ for the following reason: For example, when the cans to be passed through the tank have large mouth-openings the exit end of the tank should be lowered and the inclination of the incline $a^2$ be diminished, otherwise these cans, when rising on the incline $a^2$, would be so much tipped that too much of the liquor in the can would run out of their mouth-openings and the cans will not be properly filled. When the cans to be passed through the tank have small mouths, the exit end of the tank may be elevated and the inclination of the incline $a^2$ increased.

The time which the can-carrier occupies in passing through the tank may be varied, and is regulated by appropriate gear, as gear-wheels $t\ t'\ t^2$. Thus by substituting for the wheel $t^2$ a larger or smaller gear-wheel the speed of rotation of the pinion D, and consequently of the shafts F F' and of the pinion G', will be diminished or increased. In this connection it will be remarked that the cans containing a given article are each submitted to the boiling process for an equal and determined length of time and are not dependent upon the judgment and recollection of the attendant, as in the old process, as to the length of time for which they are boiled.

By our apparatus the contents of each can is equally boiled, and hence the product is more reliable, even, and better.

While the various features of our invention are preferably employed together, one or more of them may be employed without the remainder, and in so far as applicable one or more of said features may be employed with canning and filling devices other than those specifically herein specified.

What we claim as new and of our invention, and desire to secure by Letters Patent, is—

1. The tank provided with inclined ends $a'$ and $a^2$, and having bottom provided with tracks B B and pinions G′, in combination with the can-carrier L, having rack or teeth $l^2$, substantially as and for the purposes specified.

2. The tank provided with inclined ends $a'$ and $a^2$, and having pinions G′, and supported on supports S and T, support S being pivoted to one portion of the tank and support T having screw T′, or equivalent device, for raising and lowering the tank, substantially as and for the purposes specified.

3. The can-carrier L, in combination with cover M, provided with reticulations or openings, and the tank having track B and pinions G′, substantially as and for the purposes specified.

4. The can-carrier L, having border $l$, and recesses $l^3$, and rack $l^2$, and handles $l'$, in combination with the cover M, provided with reticulations or openings $m^2$, and the tank having track B and pinions G′, substantially as and for the purposes specified.

5. The tank having bottom inclined at ends $a'$ $a^2$, and having steam-pipes $h$, and pinion G′, and carrier L, with cover, substantially as and for the purposes specified.

6. The tank having inclined ends $a'$ $a^2$, and pinions G′, located at or near the bottom of the tank, shafts $g$, pinion G, worms $f$, shaft F, and shafts F′, connected to the latter by universal joints, and gear E, substantially as and for the purposes specified.

7. The tank having inclined ends $a'$ $a^2$, and pinions G′, located at or near the bottom of the tank, shaft $g$, pinion G, worms $f$, shaft F, and shafts F′, connected to the latter by universal joints, gear E, gear D, pinions $t^2$ $t'$ $t$, and driving-pulley, substantially as and for the purposes specified.

8. The tank having inclined end bottom portions and longitudinal partition $a$, and compartments A′ A², provided with tracks B, pinions G′, and the carrier L, provided with rack $l^2$, substantially as and for the purposes specified.

GEO. ACKERMANN.
JOHN WAGNER.

Witnesses:
JNO. W. STREHLI,
O. M. HILL.